United States Patent [19]

Kanawyer

[11] Patent Number: 4,598,549
[45] Date of Patent: Jul. 8, 1986

[54] TURBOCHARGER MANIFOLD PRESSURE CONTROL SYSTEM

[76] Inventor: Donald S. Kanawyer, 2603 Elliot St., Santa Clara, Calif. 95051

[21] Appl. No.: 740,220

[22] Filed: Jun. 3, 1985

[51] Int. Cl.⁴ .............................................. F02B 37/12
[52] U.S. Cl. ...................................... 60/611; 123/564
[58] Field of Search ................ 60/600, 601, 606, 611; 123/564; 417/302, 304, 504

[56] References Cited

U.S. PATENT DOCUMENTS 4,512,153  4/1985  Kawabata et al. .................... 60/611

FOREIGN PATENT DOCUMENTS 308451  2/1920  Fed. Rep. of Germany ...... 123/564

Primary Examiner—Michael Koczo
Attorney, Agent, or Firm—Claude A. S. Hamrick

[57] ABSTRACT

An improved turbocharger system including a plurality of selectively actuatable pressure switches and associated vent valves on the compressed charge side of the turbocharger so as to allow a selected reduction of boost pressure. The several pressure switches serve to control the operation of solenoid actuated valves in the charged flow stream leading to the engine intake. The pressure actuated switches have graduated thresholds such that during normal operation, they provide progressive actuation of the valves at higher pressures. A switch is also provided which allows selective deactivation of the high pressure switches and activation of other low pressure switches which serve to reduce the charge during cruise operation. The vented charge may be dumped to ambient, may be recirculated to the turbo input, or it may be routed to the inlet of the compressor in opposition thereto so as to prevent possible runaway of the turbocharger.

3 Claims, 3 Drawing Figures

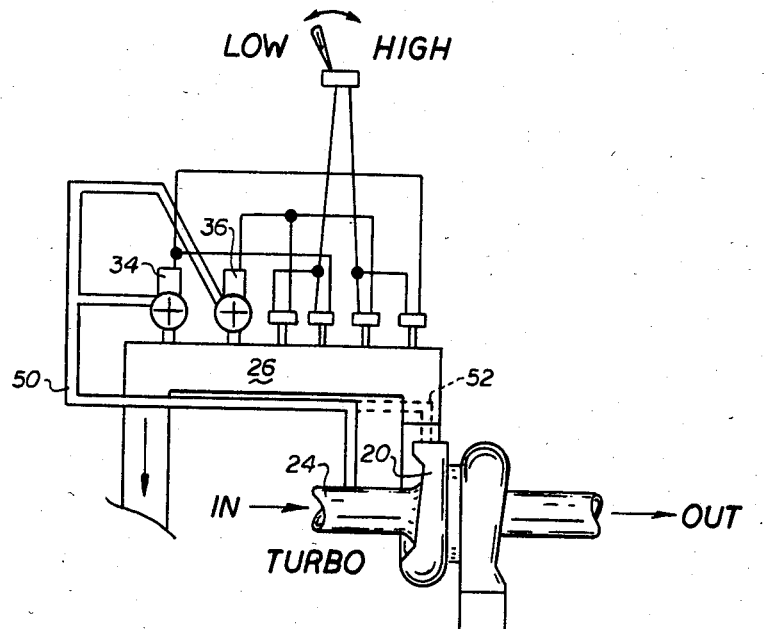
FIG_ 2
| SENSORS | A | B | C | D |
|---|---|---|---|---|
| PRESSURE | >1 | >2 | >6 | >7 |
| DURING CRUISE S. LOW | ACTIVE | | INACTIVE | |
| DURING LOAD S. HIGH | INACTIVE | | ACTIVE | |
| VALVE 1 | ▨ | ▨ | ▨ | ▨ |
| VALVE 2 | | ▨ | | ▨ |
FIG_ 3

TURBOCHARGER MANIFOLD PRESSURE CONTROL SYSTEM

BACKGROUND OF THE INVENTION

Field of the Invention

The present invention relates generally to turbocharger systems for applying high pressure air to an internal conbustion engine, and more particularly, to an improved turbocharger system having means for selectively enabling an operator of the vehicle including a turbocharger system to selectively reduce manifold pressure during cruise or other times to improve engine economy.

Modern turbochargers typically comprise a turbine and compressor mounted to a common shaft. The turbine housing includes a gas inlet and gas outlet and is coupled to the exhaust gas manifold of a combustion engine for circulation of the exhaust gases through the turbine housing to rotatably drive the turbine wheel. In turn, the turbine wheel rotatably drives the compressor wheel which compresses ambient air and supplies compressively charged air to the intake manifold of the engine.

It is advantageous to use turbochargers in that substantially higher density fuel-air mixtures can be delivered to the combustion chambers or cylinders of an engine and thereby increase engine performance and efficiency. However with many internal combustion engines, it is desirable to limit the maximum pressure or boost pressure at which charged air may be delivered to the engine at full load engine operating conditions. That is, many turbochargers are capable of delivering charged air to the engine at boost pressures substantially greater than the engine or the turbo charger can withstand. Accordingly, a wide variety of valves and other pressure control devices have been proposed to limit the maximum boost pressure of charged air supplied by the turbocharger compressor. Such boost controls typically open a by-pass flow path around the turbine wheel to by-pass off a portion of the engine exhaust gases out of driving communication with the turbine. Such arrangement utilizes a so called waste-gate valve to limit the maximum allowable rotational speed of the turbine wheel in order to limit correspondingly the maximum allowable rotational speed of the compressor wheel and thereby limit the maximum boost pressure of the charged air supplied to the engine. Structurally, these waste-gate valve arrangements include a control actuator responsive to engine or turbine charger parameters to control the opening and closing of the waste-gate valves and are available in a variety of specific constructions which can be made responsive to any of a selected number or combination of parameters such as compressor inlet pressure, compressor discharge pressure, turbine inlet pressure, or the like.

In some designs, a spring biases the valve to a closed position preventing by-pass of exhaust gases around the turbine wheel until compressor discharge pressure reaches a predetermined maximum. Other designs utilize a spring to bias the valve to an open position and couple the valve to a diaphragm responsive to parameter-indicative pressures to maintain the valve closed against the spring bias until compressor discharge pressure reaches a predetermined magnitude.

In diaphragm control pressure responsive waste-gate valve arrangements of the prior art, the waste-gate valve is maintained in a closed position preventing by-pass of exhaust gases around the turbine wheel whenever compressor discharge pressure is at or below the predetermined maximum allowable magnitude. This is desirable during substantial full load, transient operation, such as acceleration, so that the turbocharger develops substantial boost pressure. However, during part load, steady state cruise operation of the engine, substantial turbocharger boost pressure is not required and it is therefore desirable to open the turbocharger waste-gate valve to unload the turbocharger from the engine. That is, it is desirable during this part-load condition to by-pass exhaust gases around the turbine wheel to reduce back pressure on the engine and thereby correspondingly improve engine efficiency and economy. In the prior art, control actuators for controlling the position of a waste-gate valve have not been designed for the dual purpose of preventing turbocharger overboost as well as for allowing the selective opening of the waste-gate valve during part load, cruise operation. However, recent improvement along this line is disclosed in U.S. Pat. No. 4,377,070 to Alan B. Shadbourne. But the Shadbourne approach continues to accomplish its objective by by-passing the exhaust gas turbine. This has the disadvantage that it continues to achieve its objective by dealing with the extremely hot exhaust gases and therefore requires the use of materials which can withstand such high temperatures and pressures. In accordance with the present invention, it is desired to provide a means for accomplishing the intended objective by dumping the compressed air on the output side of the turbocharger so as to eliminate such disadvantages.

SUMMARY OF THE PRESENT INVENTION

It is therefore an object of the present invention to provide an improved turbocharger system which will allow selective modification of boost pressure without utilizing a waste-gate control in the exhaust system.

Another object of the present invention is to provide a means of the type described which allows the user of a turbocharger system to selectively reduce turbocharger operation during cruise conditions.

Briefly, the present invention includes the modification of a conventional turbocharger system to include a plurality of selectively actuatable pressure switches and associated vent valves on the compressed charge side of the turbocharger so as to allow a selected reduction of boost pressure. The several pressure switches serve to control the operation of solenoid actuated valves in the charged flow stream leading to the engine intake. The pressure actuated switches have graduated threshholds such that during normal operaton, they provide progressive actuation of the valves at higher pressures. A switch is also provided which allows selective deactivation of the high pressure switches and activation of other low pressure switches which serve to reduce the charge during cruise operation. The vented charge may be dumped to ambient, may be recirculated to the turbo input, or it may be routed to the inlet of the compressor in opposition thereto so as to prevent possible runaway of the turbocharger.

An important advantage of the present invention is that it allows the operator of a vehicle to select full or partial turbocharging without interfering with normal operation of the waste-gate.

Another advantage of the present invention is that through its use during cruise conditions, substantial increases in engine efficiency and fuel savings can be obtained.

Other objects and advantages of the present invention will no doubt become apparent to those skilled in the art after having read the following detailed disclosure of a preferred embodiment which is illustrated in the several figures of the drawing.

IN THE DRAWING

FIG. 2 is a partial schematic similar to that of FIG. 1 but showing an alternative embodiment in accordance with the present invention; and FIG. 3 is a diagram illustrating operation of the present invention.

DETAILED DESCRIPTION OF THE PREFERRED EMBODIMENT

Figure 1:
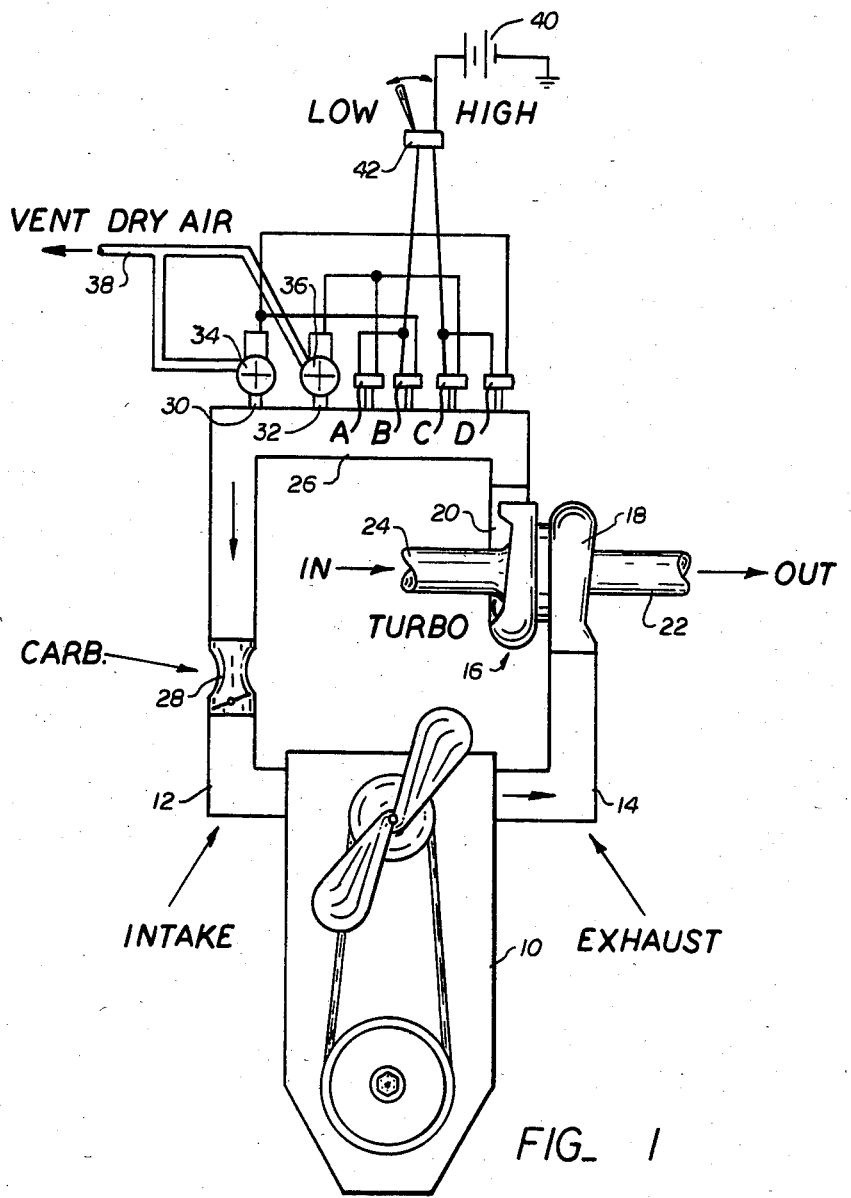
FIG. 1 is a diagram schematically illustrating a modified turbocharger system in accordance with the present invention.

Referring now to FIG. 1 of the drawing, there is shown at 10 an internal conbustion engine having an intake manifold 12 and an exhaust manifold 14. Coupled to the exhaust manifold 14 is a standard turbocharger 16 including a turbine section 18 and a compressor section 20. Turbine 18 is connected in series between exhaust manifold 14 and an exhaust pipe 22 while compressor 20 is connected in series between an inlet port 24 and a conduit 26 leading to intake manifold 12 either directly, as in the case of a fuel injected engine, or indirectly through a carburetor 28 in the case of a carbureted engine.

Mounted to conduit 26 and extending through the wall thereof in communicating relationship to the interior are four pressure switches A, B, C and D each of which is responsive to the boost pressure developed in conduit 26. Also mounted to conduit 26 and extending thereinto in communicating relationship are ports 30 and 32 having solenoid actuated valves 34 and 36 respectively connected between the ports and a venting port 38. The pressure switches A-D are selected to have stepped actuating pressures. For example, switch A might be designed to close at pressures greater than one pound above atmospheric pressure, switch B might be designed to close at pressures greater than two pounds above atmospheric pressure, switch C would be configured to close at pressures greater than six pounds above atmospheric pressure and switch D might close at pressures greater than seven pounds above atmospheric pressure. The sense pressures could, however, have any particular values and would normally be selected to match the performance characterisitcs of a particular engine.

The several switches A-D have one terminal coupled to a battery 40 through a two position switch which, in a low position, causes switches A and B to be energized, and in a high position causes switches C and D to be energized. The other terminals of switches A and B are respectively connected to the solenoids of valves 34 and 36, as are the other terminals of pressure switches C and D.

As indicated by FIG. 3, it will be appreciated that when the switch 42 is in its low position, switches A and B will be energized so as to open valve 36 when the charge in conduit 26 exceeds one pound above atmospheric pressure, and to subsequently open valve 34 when the pressure in conduit 26 exceeds two pounds above atmospheric pressure. Switch 42 would be so positioned during cruise actuation of engine 10 so as to limit the charge input to carburetor 28 by venting atmospheric over-pressures to the ambient through discharge tubes or pipes 38.

On the other hand, during periods of use requiring high performance, such as during stop and go driving or hill climbing, switch 42 would be moved into the high position in which switches C and D are energized such that the manifold pressure charge in conduit 26 is allowed to build up to at least six pounds above atmospheric pressure before switch C closes to actuate valve 32 followed by the subsequent closing of pressure switch D if the charge exceeds seven pounds above atmospheric pressure, in which case valve 34 will be opened to dump the charge through port 38 and limit the boost to slightly more than seven pounds above atmospheric pressure.

Although a similar result could be obtained using only two pressure switches; for example, one to be opened at pressures greater than two pounds and another to be opened at pressures greater than seven pounds, it will be appreciated that a sudden change in pressure from say, two pounds to six or seven pounds, or from six pounds to one or two pounds would be likely to cause engine malfunction during a transitory period. Therefore, instead of providing two large venting ports for use at a low pressure and a high pressure, two or more smaller ports have been designed to provide a more gradual or stepped change in charge during switching between low and high settings of switch 42. Although only two switches have been provided for each switch setting with each switch corresponding to one of two charge dumping valves, it will be appreciated that in order to enable even smoother transition in charge pressure, a larger number of graduated pressure switches could be utilized to actuate two or more dumping valves.

Referring now to FIG. 2 of the drawing, an alternative embodiment is shown wherein instead of venting the charge through valves 34 and 36 to atmosphere, the charge is recirculated via a conduit 50 to the input 24 of compressor 20. In so doing, no means would be required to accommodate the rather high flow of pressurized air dumped from conduit 26, and any noise created by the dumping operation would be suppressed if not eliminated altogether.

Alternatively, in order to reduce the possibility of turbine runaway during the dumping operation instead of being dumped to the inlet 24, the outlet sides of valves 34 and 36 may be routed via an extension 52 of the conduit 50 to the body of compressor 18 in a manner such that the flow of pressured air taken from conduit 26 is directed against the leading sides of the compressor blades in opposition to the atmospheric inlet flow. By this method, improvement in operation can be achieved for certain applications.

Although the present invention has been described above with reference to certain preferred embodiments, it will be apreciated that many alterations and modifications thereof will become apparent to those skilled in the art after having read such disclosure. It is therefore intended that the appended claims be interpreted as covering all such alterations and modfications as fall within the true spirit and scope of the invention.

What is claimed is:

1. In a turbocharger system including a turbine driven by exhaust gasses from an internal combustion engine, a compressor driven by said turbine and operative to deliver pressurized combustion air through a connecting conduit to the intake manifold of said engine, the improvement comprising;

- a plurality of electrically operable valve means having inlet ports communicatively coupled to said conduit and outlet ports operative when opened to provide venting for said pressurized air;
- a plurality of pressure sensitive electrical switch means, each of which it is communicatively coupled to said conduit and operatively responsive to close at different predetermined pressures; and
- a two position manual switch having a first terminal for connection to a source of electrical energy and at least two additional terminals selectively connectible to said first terminal, one of said additional terminals being electrically connected to said valve means by a first sub-group of said pressure sensitive switch means, and the other of said additional terminals being connected to said valve means by a second sub-group of said pressure sensitive switch means, whereby when said manual switch is in a first position, a first one of said switch means causes one of said valve means to be opened when a first predetermined pressure level is reached in said conduit and a second one of said switch means causes said second valve means is opened when a second predetermined pressure level is reached in said conduit, and when said manual switch is in a second position a third one of said switch means causes said first valve means to be opened when a third predetermined pressure level is reached in said conduit, and a fourth switch means causes said second valve means to be opened when a fourth predetermined pressure level is reached in said conduit, said first and second pressure levels being relatively low compared to said third and fourth pressure levels such that selection of said first switch position enables economy operation of said turbocharger system, and selection of said second switching position provides normal operation of said turbocharger system with said third and fourth switch means functioning to prevent overboost.

2. In a turbocharger system as recited in claim 1, and further comprising means for coupling the output ports of said valve means to an input port of said compressor.

3. In a turbocharger system as recited in claim 1, and further comprising means coupling the output ports of said valve means to said compressor in such a way that the vented flow opposes rotation of said compressor.

* * * * *